United States Patent Office 2,724,314
Patented Nov. 22, 1955

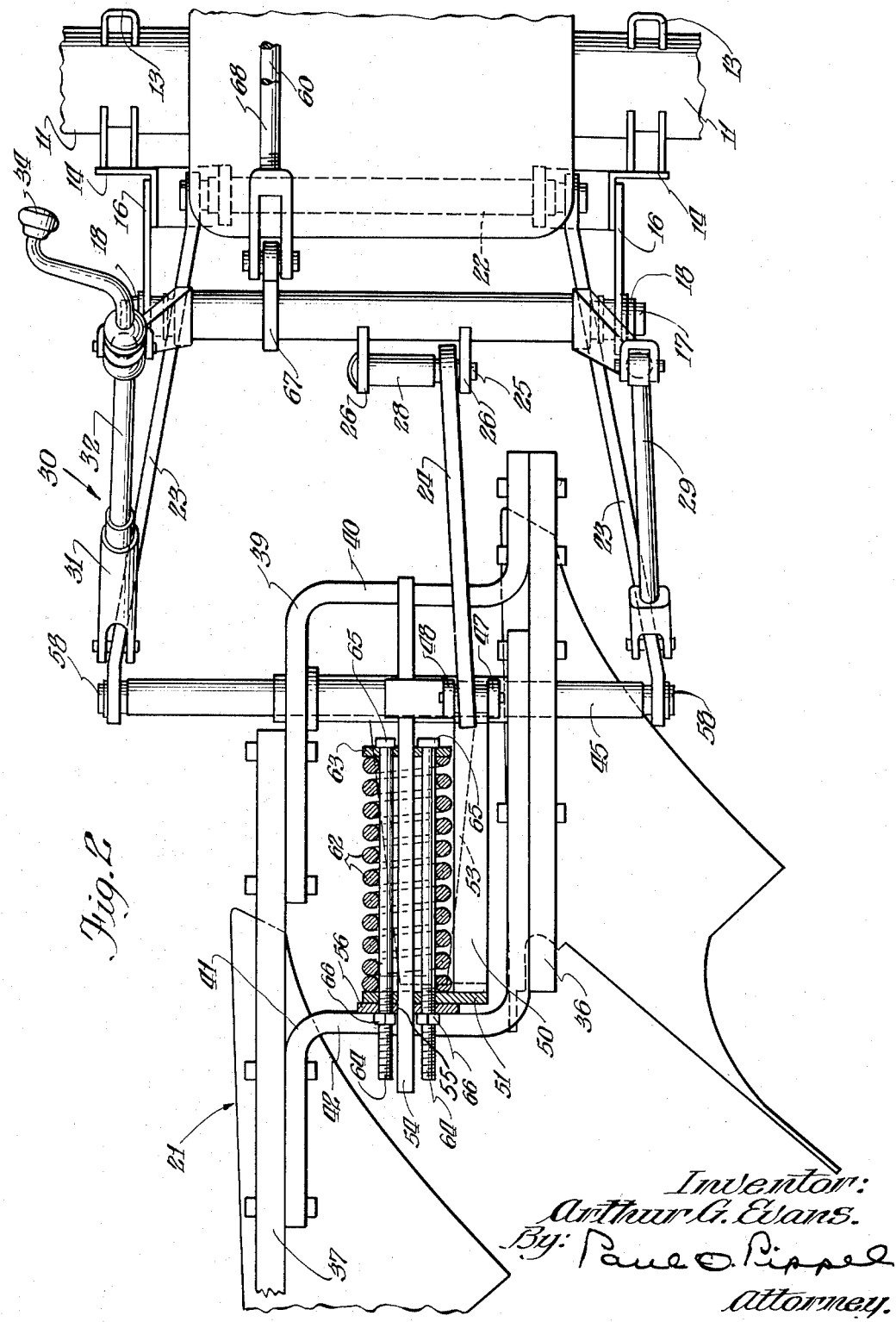

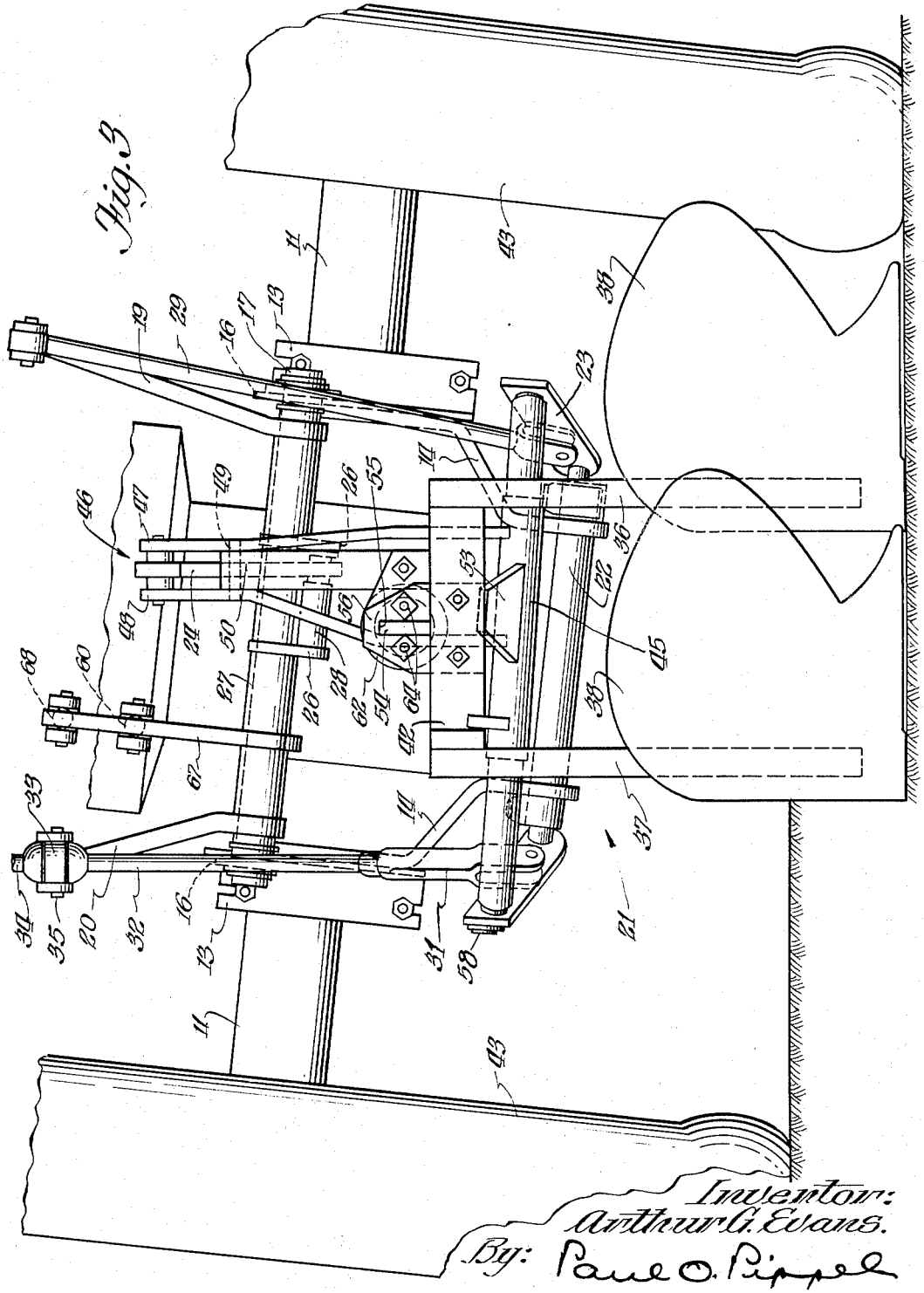

2,724,314
CUSHIONING ARRANGEMENT FOR TRACTOR-MOUNTED PLOW

Arthur G. Evans, Canton, Ill., assignor to International Harvester Company, a corporation of New Jersey Application November 17, 1950, Serial No. 196,314

6 Claims. (Cl. 97—47.62)

This invention relates to agricultural implements and particularly to a tractor mounted plow.

An important object of the invention is the provision of a tractor mounted plow having generally parallel movement during raising and lowering and also incorporating means for minimizing the danger of injury to the plow when abnormal draft forces are encountered.

Another object of the invention is to provide in a tractor mounted plow having a hitch construction incorporated therewith and adapted for connection to the tractor by vertically spaced generally parallel links, a cushioning spring connected between the hitch construction and the tool-carrying portion of the plow frame adapted to yield when obstacles are encountered.

Another object of the invention is to provide in a tractor mounted implement, a tool frame and a hitch frame adapted for connection to a tractor for parallel lifting of the tool and hitch frames as a unit, wherein the frames are slidably connected by means maintaining the rigidity of the implement but accommodating relative sliding movement of the parts in a substantially straight line.

Other objects and advantages of the invention will become clear from the following detailed description when read in conjunction with the accompanying drawings wherein:

Fig. 2 is a plan view of the construction shown in Fig. 1 with parts removed for clarity.

Fig. 3 is a rear elevation partly in section of the tractor with the plow of this invention mounted thereon and having certain parts removed.

Figure 1:
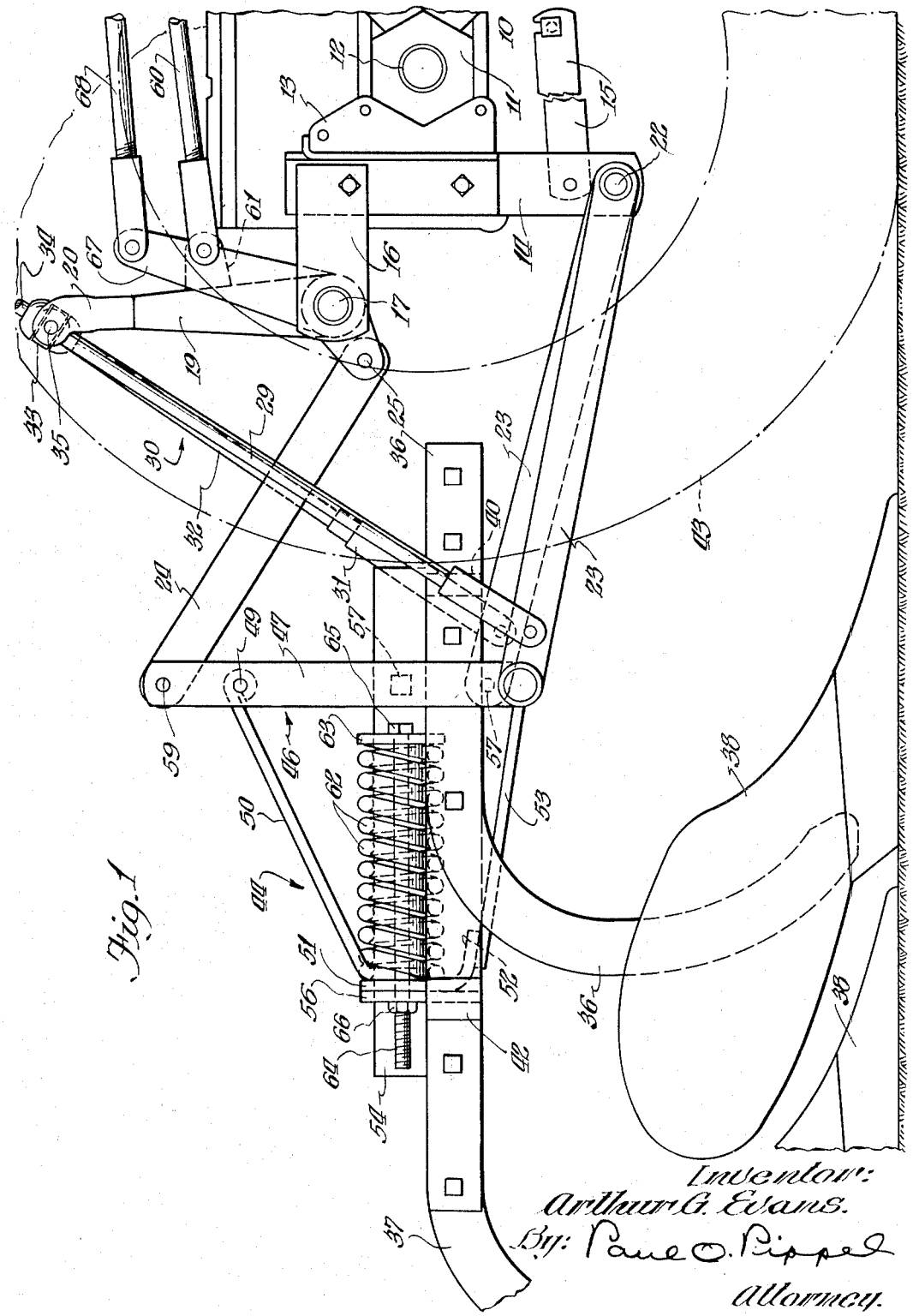
Fig. 1 is a view in side elevation of the rear portion of a tractor with the right hand drive wheel in outline showing a two bottom plow mounted upon the tractor at the rear thereof and embodying the features of this invention.

With reference to the drawings, it will be observed that the numeral 10 designates the longitudinally extending body of a tractor having laterally extending axle housings 11 in which is journaled rear axle 12.

The rear axle housing 11 is hexagonal in section, as indicated in Fig. 1, and has clamped thereto on opposite sides of the tractor body 10, bracket structures 13. Bracket structure 13 on each side of the tractor body has secured thereto a depending standard 14, one at each side of the tractor body. Each of these standards 14 is braced by a strap 15 secured to the tractor body 10.

Extending rearwardly from the upper end of each standard 14 and welded thereto is a lug 16. A transverse rock shaft 17 extends between and is supported by these lugs 16. The ends of the shaft 17 are journaled in bearings 18 carried in the ends of the lugs 16. To the ends of the rock shaft 17 are affixed as by welding lift arms 19 and 20. The lift arms 19 and 20 are utilized for the purpose of vertically moving between operating and transport positions the implement with which the present invention is concerned and which is designated generally by the numeral 21.

Connection is made between the implement 21 and the tractor by means of a set of forwardly converging links now to be described. The lower ends of the standards 14 support the ends of a transverse member 22, and upon the laterally projecting ends of the member 22 are pivotally mounted for substantially universal movement, the forward ends of rearwardly extending laterally spaced links 23. The links 23 diverge rearwardly from their connection to the transverse member 22 and constitute the lower of a triangular set of vertically spaced forwardly converging links, the upper of which is designated by the numeral 24. The forward end of link 24 is pivotally mounted upon a pin 25 extending between lugs 26 welded to a sleeve 27 mounted upon the shaft 17 for rotation thereon. The lugs 26 extend rearwardly and downwardly at an angle from the sleeve 27, and a spacer 28 is provided between one of the lugs and the upper link 24. The right-hand link 23 is connected by a lift rod 29 to the lift arm 19 on shaft 17, and left-hand lower link 23 is connected by a rod 30 to the arm 20 at the other end of shaft 17. Rod 30 is itself composed of a socket member 31 threaded to receive one end of a rod 32, the other end of which has mounted thereon a swivel 33 and which terminates in a crank 34. Swivel 33 has trunnions 35 thereon rotatably received in apertures in the bifurcated upper end of the arm 20.

The triangular converging link arrangement formed by the upper link 24, centrally located, and the laterally spaced lower links 23, forms part of the mechanism by which the implement is attached to the tractor to provide a theoretical hitch point ahead of the tractor rear axle. The implement 21 is a two-bottom moldboard plow and comprises laterally spaced longitudinally extending tool carrying beams 36 and 37. These two beams are offset longitudinally so that the left-hand beam 37 extends rearwardly beyond the rear end of beam 36. Each of these beams is curved downwardly and forwardly at its rear end and each has mounted thereupon a moldboard plow bottom 38 of conventional form. These beams 36 and 37 have their longitudinally extending portions substantially parallel to the ground line, and in Fig. 1 the plow is shown in an operative position with the plow bottoms resting upon the bottom of the furrow. The forward ends of the beams 36 and 37 are connected by an angled brace member 39 having a transverse portion 40. The rear ends of the beams are connected by an angled brace member 41 having a transverse portion 42 parallel to and in substantially longitudinal alignment with the transverse portion 40 of the member 39. These braces 39 and 41 serve as longitudinally spaced frame members serving a purpose which will hereinafter become clear.

In Fig. 3 it will be noted that the right wheel 43 of the tractor is in a furrow and the plows are in operation. In this position the frame of the plow formed by the beams 36 and 37 and the connecting braces is substantially level with the ground and occupies an angle with respect to the tractor since the tractor itself is leaning. It will also be observed that there is mounted upon the implement 21 a hitch frame designated by the numeral 44. This hitch frame 44 is generally triangular in shape and comprises a transversely extending cylindrical member 45 which serves as a draw bar. Member 45 slants upwardly from right to left with respect to the plow frame and has mounted upon the central portion thereof a vertically extending standard 46 comprising laterally spaced straps 47 and 48. These straps diverge at their lower ends and are welded to the transverse member 45. The vertically extending standard 46 projects upwardly between the beams 36 and 37, as indicated in Fig. 3, and the plow beams rest upon the member 45. Mounted upon a pin 49 is a rearwardly and downwardly extending strap 50, the rear end of which is welded to a plate 51 having a forwardly bent lower edge 52 to which is welded a triangularly shaped bracing plate 53, the forward end of which is affixed to the transverse draw bar member 45.

At this point it should be clear from the foregoing description that the triangular hitch frame 44 is not affixed to the plow frame composed of the tool carrying beams 36 and 37 but is movable relative thereto. This movement is confined to displacement of the hitch frame in a straight line longitudinally relative to the plow beams by mechanism including a longitudinally extending guide bar 54 which, as clearly shown in Figs. 1 and 2, is parallel to the beams 36 and 37 and spans and rests upon the transverse portions 40 and 42 of the respective longitudinally spaced frame members or braces 39 and 41. This guide bar 54 is slidably received in a slot 55 formed in a plate 56 affixed to the transverse portion 42 of brace 41 and projecting upwardly therefrom. The forward end of guide bar 54 is affixed by bolt 57 to the left-hand strap 48 of the vertical standard 46. Thus movement of the hitch frame portion 44 relative to the tool supporting structure is confined to a straight line, and buckling or pivoting movement of the hitch frame relative to the tool supporting structure is prevented since the lower edges of the plow beams engage the draw bar 45 and the guide member 54 rides upon and engages the braces 39 and 41.

Connection is made between the implement and the tractor by pivotally mounting the rear ends of the links 23 upon spindles 58 projecting from the ends of the transverse member 45. Upper link 24 extends rearwardly and upwardly from the pin 25 and is pivotally mounted upon a pin 59 received between the upper ends of the straps 47 and 48 of standard 46. The entire implement is thus supported upon the tractor by means of the parallel links 23 and 24 and the lift arms 19 and 20. Rocking of the shaft 17 and of the lift arms 19 and 20 to raise and lower the implement with respect to the tractor between operating and transport positions is accomplished by mechanism which includes a rod 60 pivotally connected at its rear end to a lug 61 secured to the arm 20 and extending forwardly to a source of power, not shown, by which the rod 60 is moved lengthwise of the tractor to rock the shaft 17 and therefore the lift arms 19 and 20 to raise and lower the implement.

The implement is maintained rigid while accommodating relative longitudinal movement between hitch frame 44 and the tool carrying beams by the slide and guide mechanism previously described. The purpose of permitting relative movement of the tool carrying beams is to avoid shocks when obstacles or other excessive draft conditions are encountered by the plow bottoms 38. The idea is to permit the plow bottoms to move rearwardly, and this relative rearward movement with respect to the tractor and the hitch structure is yieldably opposed by a compression spring 62 which at one end abuts the plate 51 and at the other end abuts a plate 63 also provided with a slot to slidably receive the guide 54. Tension on the spring 62 may be adjusted by a pair of elongated threaded bolts 64, one on each side of the guide bar 54. Each bolt 64 extends through openings in the plates 51, 56 and 63, a head 65 being provided adjacent the plate 63 and a nut 66 being mounted upon the threaded end of the bolt 64 projecting rearwardly from the plate 56.

The sleeve 27 and the lugs 26 are prevented from rocking about the axis of the shaft 17 by an arm 67 which projects upwardly from the sleeve 27 and is welded thereto at its lower end. This arm is connected by a rod 68 with power operated adjusting mechanism, not shown, deriving power from the tractor for effecting longitudinal movement of the rod 68 when adjustment of the position of sleeve 27 and of link 24 is desired. Leveling of the plow is accomplished by the lifting link 30 and crank 34 previously described. Operation of the crank 34 increases or decreases the length of the link 30 by turning the threaded end of the rod 32 in the threaded socket member 31.

Operation of the implement of this invention should be clear from the foregoing description. It may be noted, however, that upon encountering excessive draft causing the spring 62 to yield in compression, the hitch frame 44 with the guide bar 54 remains with the connecting parallel link structure while the plow, including the tool beams 36 and 37, the plates 56 and 63, and the rods 64, move rearwardly against the action of the spring 62 in a substantially straight line. While the invention has been described in its preferred embodiment, it may likewise be understood that modifications may be made therein without departing from the spirit of the invention or the scope of the appended claims.

What is claimed is:

1. In an implement attachment for a tractor, a tool carrier having longitudinally spaced frame members, hitch means for connecting the tool carrier to the rear of the tractor comprising a transverse member serving as a draw bar, vertically spaced links pivotally connected to the draw bar and extending forwardly therefrom, means pivotally connecting the forward ends of said links to the tractor to accommodate lifting of the implement upon the tractor to be transported thereby, a draft connection between the tool carrier and the hitch means accommodating relative longitudinal movement in a substantially straight line therebetween, said draft connection including a longitudinally extending guide member carried by the hitch means and engageable at longitudinally spaced locations with said spaced frame members to stabilize the implement during said relative movement between the tool carrier and the hitch means, and a compression spring between the carrier and the hitch means arranged to yieldably oppose said relative movement.

2. In an implement attachment for a tractor, a tool carrier having longitudinally spaced frame members, hitch means for connecting the tool carrier to the rear of the tractor comprising a transverse member serving as a draw bar, vertically spaced links pivotally connected to the draw bar and extending forwardly therefrom, means pivotally connecting the forward ends of said links to the tractor to accommodate lifting of the implement upon the tractor to be transported thereby, and a draft connection between the tool carrier and the hitch means accommodating relative longitudinal movement in a substantially straight line therebetween, said draft connection including stabilizing means comprising an elongated member carried by the hitch means, means mounted on the tool carrier and cooperable with said member to slidably receive the latter, and resilient means between the carrier and hitch means opposing relative movement of the carrier and hitch means about a transverse axis.

3. In an implement attachment for a tractor, a tool carrier having longitudinally spaced frame members, hitch means for connecting the tool carrier to the rear of the tractor comprising a transverse member serving as a drawbar, vertically spaced links pivotally connected to the draw bar and extending forwardly therefrom, means pivotally connecting the forward ends of said links to the tractor to accommodate lifting of the implement upon the tractor to be transported thereby, a slotted part carried by one of said frame members, a guide member carried by the hitch means slidably received in the slot in said part and slidably engageable with said frame members whereby relative translational movement in a substantially straight line between the tool carrier and the hitch means is accommodated, and a spring connecting the tool carrier with the hitch means to yieldably oppose said relative movement.

4. In a tractor-mounted implement including a pair of laterally spaced tool-supporting beams, transversely extending longitudinally spaced braces connecting said beams, a hitch frame forming a part of the implement having a rigid longitudinally extending guide member secured thereto and slidably engageable with said braces, a slotted member carried by the implement to slidably receive the guide member and hold it in frictional engagement with said braces while accommodating relative movement in a substantially straight line of the tool-supporting beams and the hitch frame, and connecting means between the hitch frame and the tractor for raising and lowering the implement.

5. In a tractor-mounted implement including a pair of laterally spaced tool-supporting beams, transversely extending longitudinally spaced braces connecting said beams, a hitch frame forming a part of the implement having a rigid longitudinally extending guide member secured thereto and slidably engageable with said braces, a slotted member carried by the implement to slidably receive the guide member and hold it in frictional engagement with said braces while accommodating relative movement in a substantially straight line of the tool-supporting beams and the hitch frame, a cushion spring associated with said guide member and extending between the tool-supporting beams and the hitch frame to yieldably oppose relative movement therebetween, and connecting means between the hitch frame and the tractor for raising and lowering the implement.

6. In a tractor-mounted implement comprising longitudinally extending tool-supporting beams adapted for connection to a tractor to be lifted thereby, a hitch frame including forwardly converging links connected between the front end of the implement and the tractor to maintain substantial parallelism of said tool-supporting beams with the ground during lifting, a slidable connection between said beams and said hitch frame to permit movement of the beams in a straight line longitudinally relative to the hitch frame in response to draft on the tools, means yieldably opposing said relative movement, said slidable connection including a slotted member carried by the beams, a guide bar secured to the hitch frame and receivable in the slot in said slotted member, and a spring surrounding said guide member between the beams and the hitch frame to yieldably oppose relative movement of the beams and the hitch frame.

References Cited in the file of this patent

UNITED STATES PATENTS

| Number | Name | Date |
|---|---|---|
| 642,349 | Martin | Jan. 30, 1900 |
| 1,174,699 | Dunlap | Mar. 7, 1916 |
| 1,441,773 | Witter | Jan. 9, 1923 |
| 1,900,440 | Ferguson | Mar. 7, 1933 |
| 2,346,757 | Horner | Apr. 18, 1944 |
| 2,359,206 | Currie | Sept. 26, 1944 |
| 2,364,887 | Wray | Dec. 12, 1944 |
| 2,551,451 | Morkoski | May 1, 1951 |
| 2,602,389 | Markel | July 8, 1952 |